F. KRUSE.
MEAT PRESS AND FILLER.
APPLICATION FILED MAR. 17, 1920.
1,417,610.
Patented May 30, 1922.
3 SHEETS—SHEET 1.
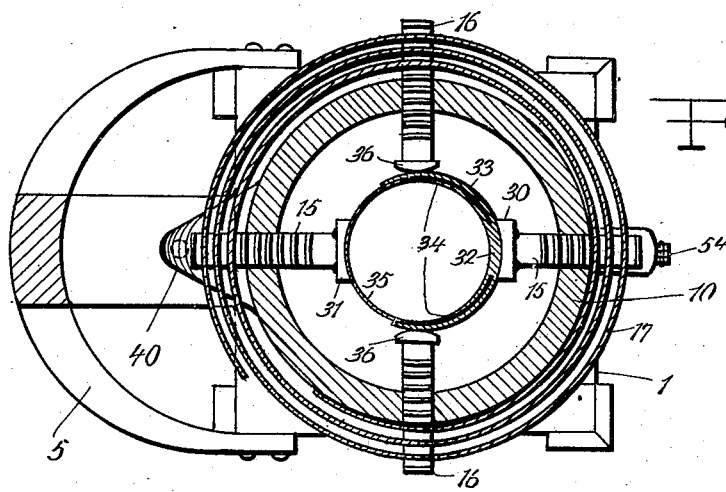
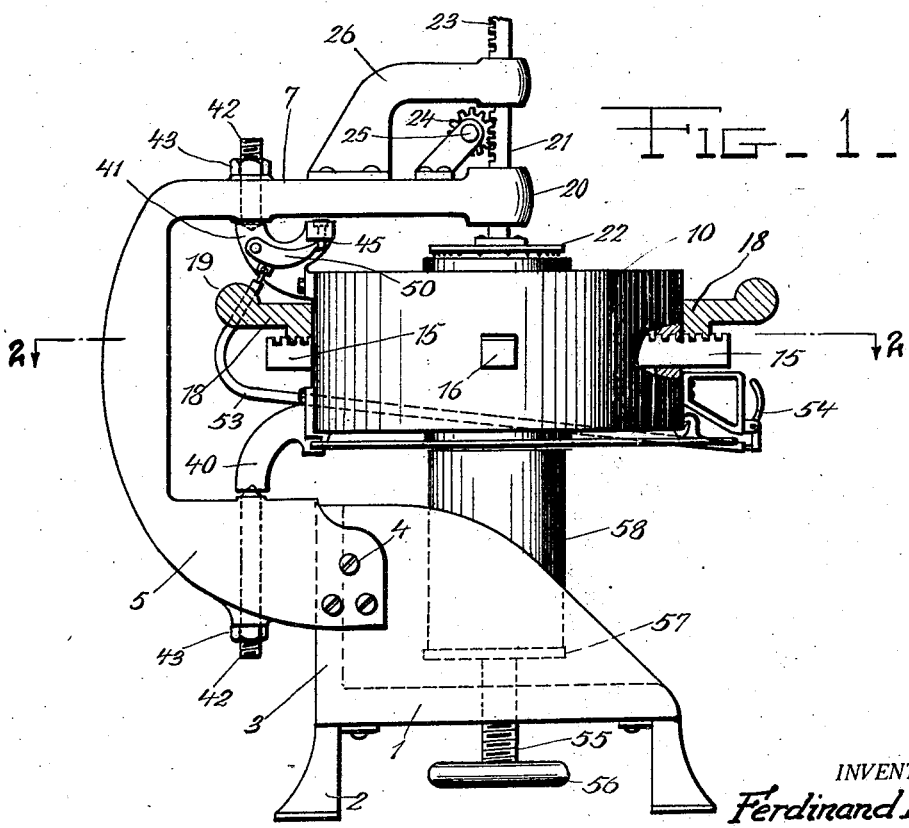
INVENTOR.
Ferdinand Kruse
BY
ATTORNEYS

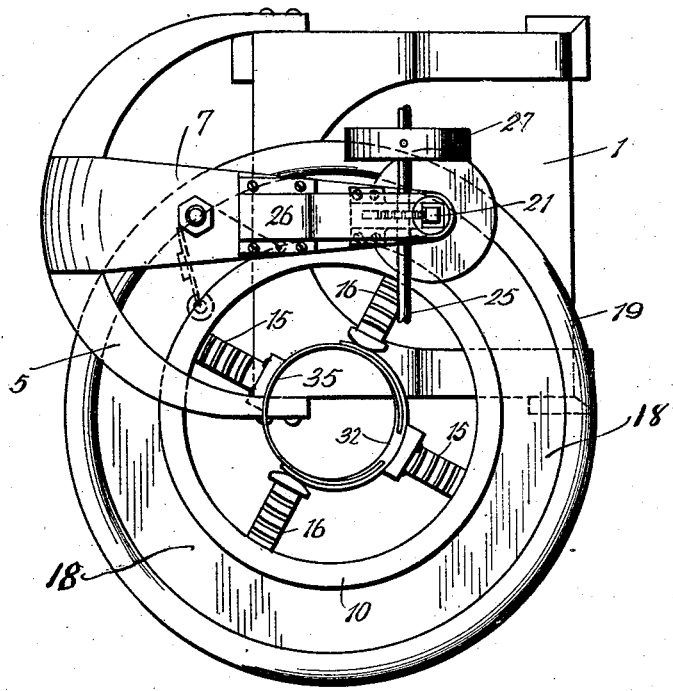
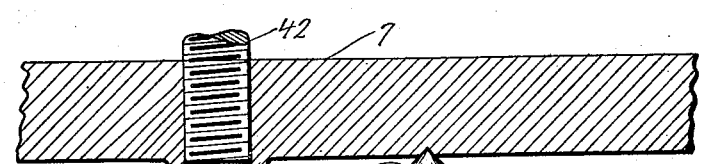

F. KRUSE.
MEAT PRESS AND FILLER.
APPLICATION FILED MAR. 17, 1920.
1,417,610.
Patented May 30, 1922.
3 SHEETS—SHEET 3.
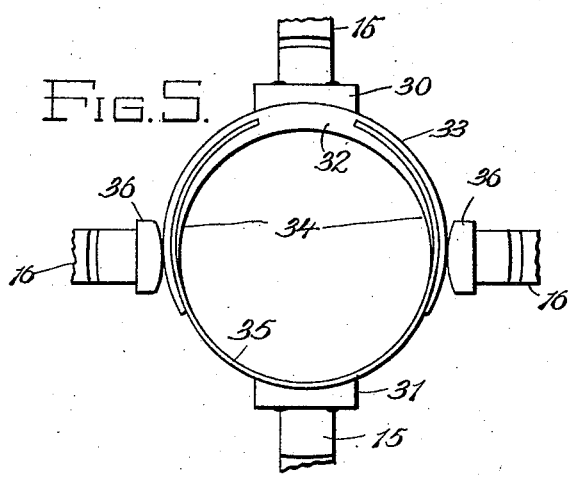
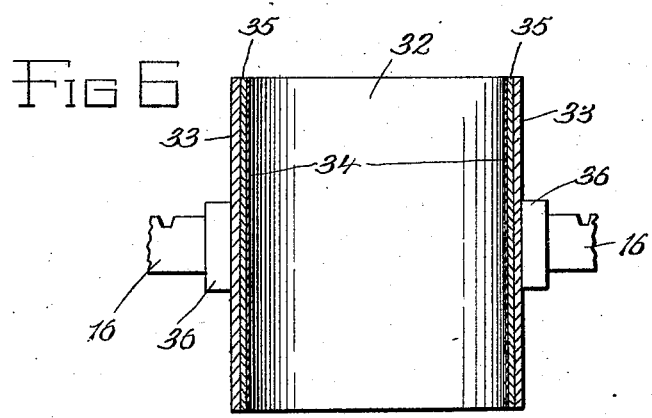
Inventor
Ferdinand Kruse
By his Attorney

UNITED STATES PATENT OFFICE.

FERDINAND KRUSE, OF PORT RICHMOND, NEW YORK.

MEAT PRESS AND FILLER.

1,417,610.  Specification of Letters Patent.  Patented May 30, 1922.

Application filed March 17, 1920. Serial No. 366,647.

*To all whom it may concern:*

Be it known that I, FERDINAND KRUSE, a citizen of the United States, residing at Port Richmond, county of Richmond, and State of New York, have invented certain new and useful Improvements in Meat Presses and Fillers, of which the following is a specification.

This invention relates to a machine for pressing meats or the like into compact masses of a desired shape, preferably cylindrical, the present invention being an improvement over a previous one filed by me July 24, 1919, under Serial Number 312,999.

The present invention has the same general object as the said previous one of providing an improved machine in which cooked meats of various kinds and in various conditions of substance, as chopped, ground, etc., may be compactly pressed in a rapid and practical manner.

More specifically, the present invention has for an object to arrange the formers so that they may be readily shifted for filling purposes.

These objects are attained by the novel construction, combination and arrangement of parts hereinafter described and shown in the accompanying drawings forming a material part of this disclosure, and in which—

Figure 1 is a side elevation, with parts broken away, of a meat press embodying the invention.

Figure 2 is a horizontal section on the line 2—2 of Fig. 1.

Figure 3 is a plan view.

Figure 4 is an enlarged fragmentary vertical section showing the mounting and locking means for the formers.

Figure 5 is an enlarged fragmentary plan view illustrating particularly the construction of the two part former cylinder.

Figure 6 is a vertical axial section of the parts shown in Figure 5.

As here shown my improved meat press comprises a base 1 mounted on legs 2 and having an upstanding flange 3 extending around three sides thereof. Secured as by screws 4 to this flange is a bracket 5 having at its top an integral horizontal arm 7 which extends over the base, the formers being located between this arm and the base.

The forming devices comprise a heavy ring 10 having four equally spaced rectangular openings in the wall thereof which have slidable therein opposed pairs of bars 15, 16 having teeth upon their upper sides adapted to engage with spiral teeth or convolutions 17 extending downward from another ring 18, closely circumjacent to the ring 10, and provided with an endless rim or rail 19 of circular cross section adapted to operate in the manner of a handwheel when grasped by an operator, it being apparent that rotation of ring 18 will move the bars 15 and 16 radially.

The arm 7 has a head 20 thereon in axial alinement with the ring 10 and in said head is slidably mounted a vertical plunger bar 21 having a presser disk or head 22 on its lower end. This plunger bar 21 has rack teeth 23 formed on one side thereof and engaged by a gear pinion 24 fixed on a shaft 25 journaled in a bracket 26 carried on the arm 7, the shaft 25 having a wheel 27 thereon whereby it may be rotated.

Carried by the inner ends of the bars 15 are heads 30, 31 having concave inner faces and to the head 30 is rigidly engaged a curved former 32, having outwardly extending arms 33 each containing parti-circular recesses, the inner elements 34, of the arms being bevelled to form thin knife-like edges. These arm like elements are formed of resilient material and extend vertically in registry with the plunger head 22.

Engageable in the recesses formed in the arms 33 of the curved former 32 is a bent vertical plate 35 of highly resilient material, secured to the head 31 at the opposite sides of the machine so that the plate 35 and former element 32 may be moved to or from each other, and in order to assist in maintaining these elements in an essentially cylindrical position other heads 36 are attached to the inner ends of the bars 16 and make contact with the exterior of the arms 33 for that purpose.

As will be apparent the ring 10 forms the support for the forming devices and to enable the ring to be swung to one side it is provided on one side with arms 40, 41 on which it is fixed, these arms being pivoted respectively on the base of the bracket 5 and the arm 7 carried by the bracket, the arms having conical recesses engaged by the conical tips of screws 42 threaded through the bracket elements and locked in adjusted position by nuts 43.

To lock the ring 10 in its proper position the arm 41 has a recessed offset 45 in which is slidable a pin 46 having a conical head 47 adapted to engage in a complementary recess in the underside of the bracket arm 7. This pin is pressed upwardly by a spring 48, the upward movement being limited by a flange 49. Formed in one side of the pin 46 is a suitable notch and in this notch is engaged the end of a lever 50 pivoted as at 51 to the arm 41 and having connected thereto one end of a flexible wire 52 which passes downwardly and forwardly through a fixed tube 53 and connects at its forward end to a hand lever 54 by operation of which the pin 46 is depressed from engagement with the arm 7 leaving the forming device free to swing.

A screw 55 passes upward through the base 1 in registry with the plunger bar 23 and is provided with a handwheel 56 on its lower end and with a circular platform 57 on its upper end adapted to receive a cylindrical container 58, holding the same in registry with the vertical centre of the elements when the same are in closed position so that when the forming devices are swung to operative position, the compacted contents of the forming elements may be forced down into the container by rotation of wheel.

Having thus described my invention, what I claim as new and desire to protect by Letters Patent of the United States is as follows:

1. A meat pressing machine, comprising a base, a bracket secured to said base and comprising top and bottom horizontal members united by a vertical member, a forming device having a pair of arms projecting from one side at the top and bottom thereof, bearing elements on the horizontal members of said bracket with which said arms are pivotally engaged, a plunger head vertically movable in the said top horizontal member, and means removably locking said forming device to said top horizontal member.

2. In a meat pressing machine, a forming device adapted to engage and compress the meat laterally, a plunger head adapted to compress the meat vertically, and means for mounting said forming device to permit of lateral movement into and out of registry with said plunger head and means for automatically locking said forming device in position registering with the said plunger head said means including a spring pressed pin carried by the forming device and engaging in a recess in the frame of the machine and means for releasing said pin including a lever in engagement with the said pin, a flexible wire connected to said lever and leading to the front of the machine, and a tube enclosing said wire.

In testimony whereof I have affixed my signature.

FERDINAND KRUSE.